United States Patent
Barthlow

(10) Patent No.: US 9,216,772 B2
(45) Date of Patent: Dec. 22, 2015

(54) STEERING SHAFT RETAINER AND GAP HIDER

(71) Applicant: FORD GLOBAL TECHNOLOGIES, LLC, Dearborn, MI (US)

(72) Inventor: Michael Barthlow, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 123 days.

(21) Appl. No.: 14/153,543

(22) Filed: Jan. 13, 2014

(65) Prior Publication Data

US 2015/0197286 A1 Jul. 16, 2015

(51) Int. Cl.

| B62D 25/14 | (2006.01) |
|---|---|
| B60K 35/00 | (2006.01) |
| B62D 1/20 | (2006.01) |
| B60Q 3/02 | (2006.01) |
| B62D 1/16 | (2006.01) |

(52) U.S. Cl.
CPC .............. *B62D 25/14* (2013.01); *B60K 35/00* (2013.01); *B60Q 3/02* (2013.01); *B62D 1/16* (2013.01); *B62D 1/20* (2013.01)

(58) Field of Classification Search
CPC ........ B62D 25/145; B62D 25/14; B62D 1/16; B62D 1/183; B62D 1/20; B60Q 3/02; B60Q 3/0203; B60Q 3/024; B60Q 3/0209; B60Q 3/04; B60Q 3/042; B60Q 3/044; B60K 37/02; B60K 37/04
See application file for complete search history.

(56) References Cited

U.S. PATENT DOCUMENTS

| 3,174,576 | A | * | 3/1965 | Woofter et al. ................ 180/90 |
|---|---|---|---|---|
| 6,056,297 | A | * | 5/2000 | Harkrader et al. ............ 277/634 |
| 6,073,987 | A | | 6/2000 | Lindberg et al. |
| 6,092,854 | A | * | 7/2000 | Campbell ....................... 296/70 |
| 6,419,270 | B1 | | 7/2002 | Boyle, III et al. |
| 6,802,559 | B2 | | 10/2004 | Yoshihara et al. |
| 7,180,020 | B2 | | 2/2007 | Onoda et al. |
| 7,506,433 | B2 | | 3/2009 | Sawada et al. |
| 7,832,765 | B2 | * | 11/2010 | Park .............................. 280/771 |
| 8,888,132 | B2 | * | 11/2014 | Allen ............................ 280/779 |
| 2004/0129098 | A1 | * | 7/2004 | Gayer et al. ...................... 74/18 |
| 2009/0033126 | A1 | * | 2/2009 | Mullen et al. ............ 296/193.02 |
| 2009/0246505 | A1 | * | 10/2009 | Evans et al. ................ 428/316.6 |
| 2013/0057015 | A1 | * | 3/2013 | Allen .............................. 296/70 |
| 2014/0084629 | A1 | * | 3/2014 | Atsumi .................... 296/193.02 |

FOREIGN PATENT DOCUMENTS

| EP | 1162127 A2 | 12/2001 |
|---|---|---|
| JP | 06-199152 | 7/1994 |

* cited by examiner

*Primary Examiner* — James English
(74) *Attorney, Agent, or Firm* — Vichit Chea; MacMillan, Sobanski & Todd, LLC

(57) ABSTRACT

An instrument panel subassembly for a motor vehicle has a cross beam providing a main structural support for the subassembly. An instrument panel substrate is mounted to the cross beam. A steering shaft assembly has an upper end with a swivel connection to the substrate and has a lower end for coupling to a steering gear assembly. A closeout trim panel comprising an elongated strip is mounted to the cross beam and has a snap-in retainer slot positioned to temporarily retain the steering shaft assembly prior to final coupling to the steering gear assembly at a substantially fixed position. The fixed position is spaced away from a final position of the steering shaft assembly when coupled to the steering gear assembly, and the retainer slot flexes to permit manual insertion and removal of the steering shaft assembly.

7 Claims, 4 Drawing Sheets

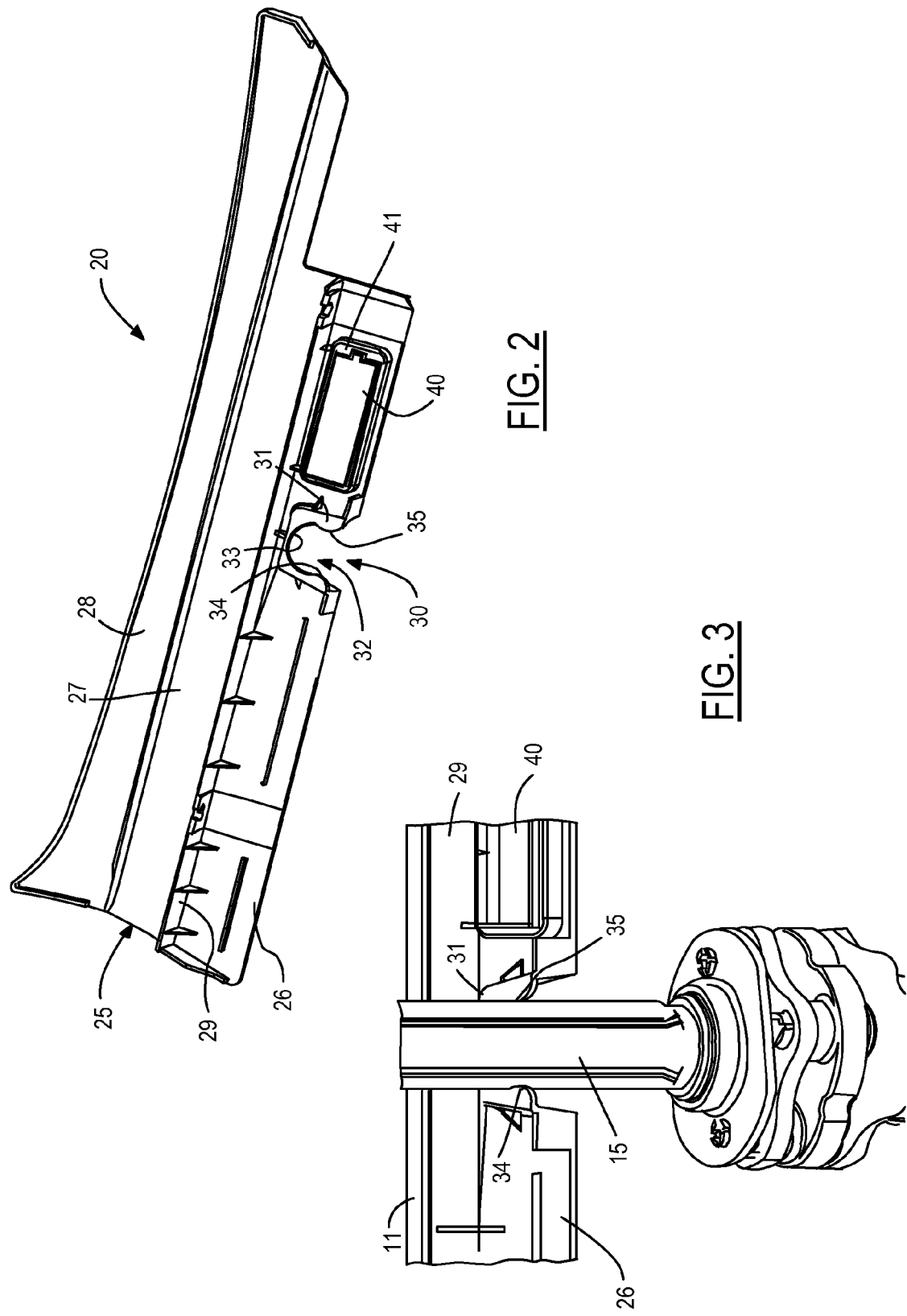

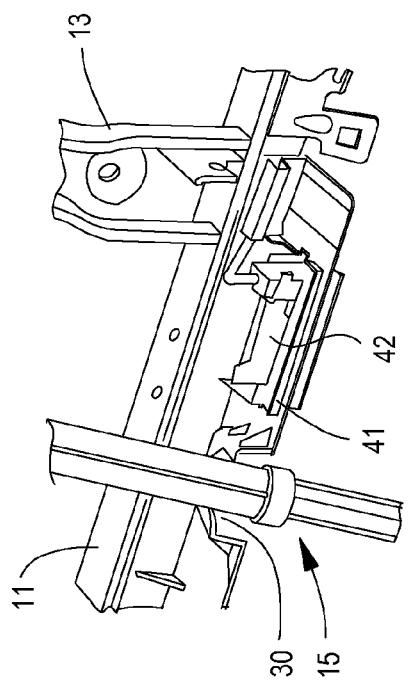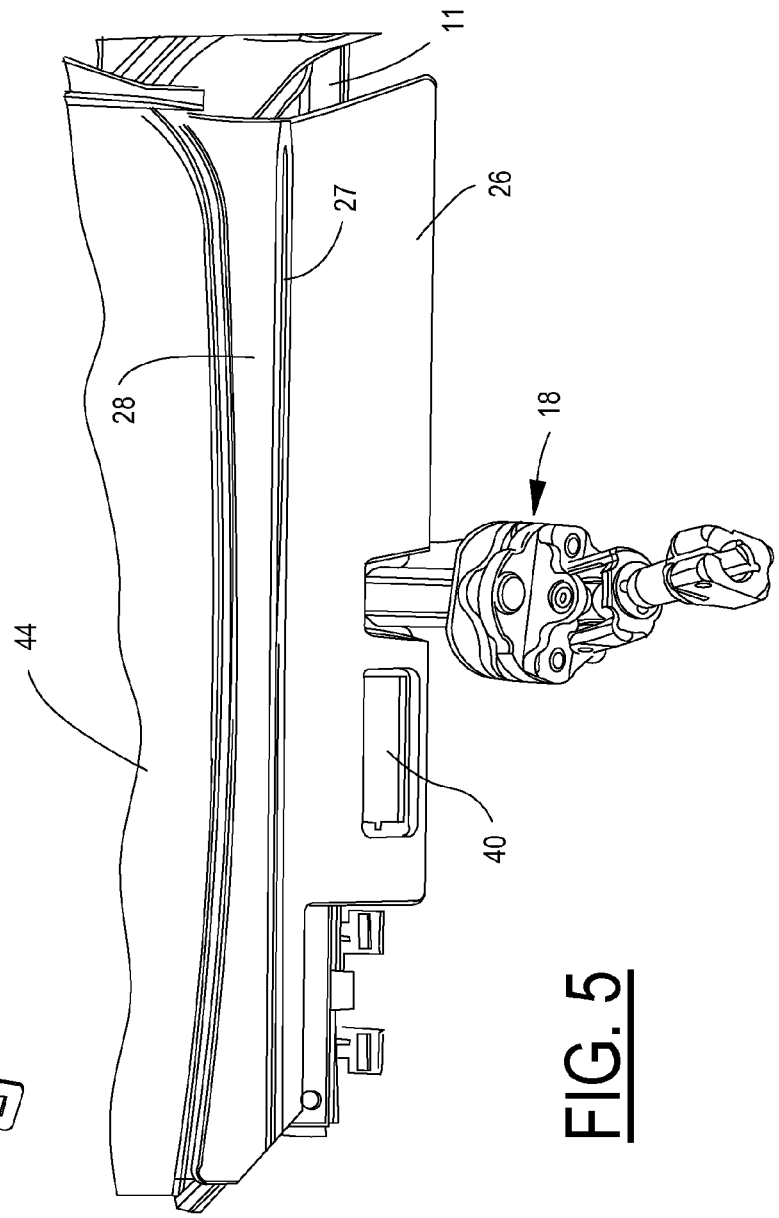
FIG. 4
FIG. 5

STEERING SHAFT RETAINER AND GAP HIDER

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to modular instrument panel assemblies for motor vehicles, and, more specifically, to providing temporary retention of a steering shaft assembly during transportation and final installation of an instrument panel subassembly into a vehicle at a vehicle assembly plant. The instrument panel or dashboard of a motor vehicle is typically constructed as a modular subassembly by a automotive component supplier who ships the subassembly to an automobile assembly plant. The instrument panel subassembly is transferred to an assembly line for placement in and attachment to a vehicle being assembled. The instrument panel subassembly typically includes a cross car beam to which a molded substrate is attached. Various components such as electronic modules, gauges, displays, climate control components, audio entertainment components, and finish trim pieces are mounted to the substrate by the supplier. In addition, a steering shaft assembly and steering wheel are usually also mounted to the subassembly. The steering shaft assembly may include a steering shaft and a steering column covering at least a portion of the shaft. The shaft assembly extends between a steering wheel at one end and a coupler for attaching to a steering gear assembly at the other end.

The upper end of the steering shaft assembly is loosely mounted to the instrument panel subassembly resulting in a swivel connection which allows the lower end of the steering shaft assembly to pivot over a large area. The swiveling connection may result from the presence of a universal joint at the upper end of the steering shaft assembly or merely of a loose retention between the steering mechanism and the instrument panel.

Unrestrained movement of the lower end of the steering shaft assembly is undesirable whether at the supplier's plant during original assembly of the instrument panel subassembly itself, during transportation to the assembly plant, or at the assembly plant during manipulation at the assembly line as he instrument panel subassembly is put into place and connected to the vehicle. In order to avoid damage to surrounding components and potential injury to assembly operators that could result if the lower portion of the shaft assembly is left unsecured, the lower portion of the steering shaft assembly is typically secured to either the cross car beam or a portion of the instrument panel substrate. Most often, a disposable method using either a tie wrap, tape, or other types of disposable connectors has been used to hold the shaft in place. The conventional methods of attachment have resulted in undesirable added costs. Removal of the attachment increases the manufacturing time and adds to material waste. Sometimes special tooling has been required to assist the operator in removal, adding more costs. Furthermore, the design of the instrument panel subassembly and substrate do not always provide a convenient and secure place for making the necessary attachment.

SUMMARY OF THE INVENTION

In one aspect of the invention, an instrument panel subassembly comprises a cross beam providing a main structural support for the subassembly. An instrument panel substrate is mounted to the cross beam. A steering shaft assembly has an upper end with a swivel connection to the substrate and has a lower end for coupling to a steering gear assembly. A closeout trim panel comprising an elongated strip is mounted to the cross beam and has a snap-in retainer slot positioned to temporarily retain the steering shaft assembly prior to final coupling to the steering gear assembly at a substantially fixed position. The fixed position is spaced away from a final position of the steering shaft assembly when coupled to the steering gear assembly, and the retainer slot flexes to permit manual insertion and removal of the steering shaft assembly.

BRIEF DESCRIPTION OF THE DRAWINGS

FIG. 2 is a top, perspective view of the closeout trim panel of FIG. 1.

FIG. 3 is a close-up view of the snap-in connection of FIG. 1.

FIG. 4 is a perspective view of the closeout trim panel with a light source installed in the mounting aperture.

FIG. 5 is a bottom, perspective view showing the shaft assembly in the snap-in retainer.

DETAILED DESCRIPTION OF PREFERRED EMBODIMENTS

The present invention provides a one-piece molded component featuring a retention detail to temporarily hold the steering shaft assembly which can be secured and unsecured manually without tools. Moreover, the invention integrates a gap hider feature to help provide a high-quality visual appearance for the instrument panel subassembly, while simultaneously providing and mounting location for ambient foot well lighting, thereby reducing the total number of components.

Figure 1:
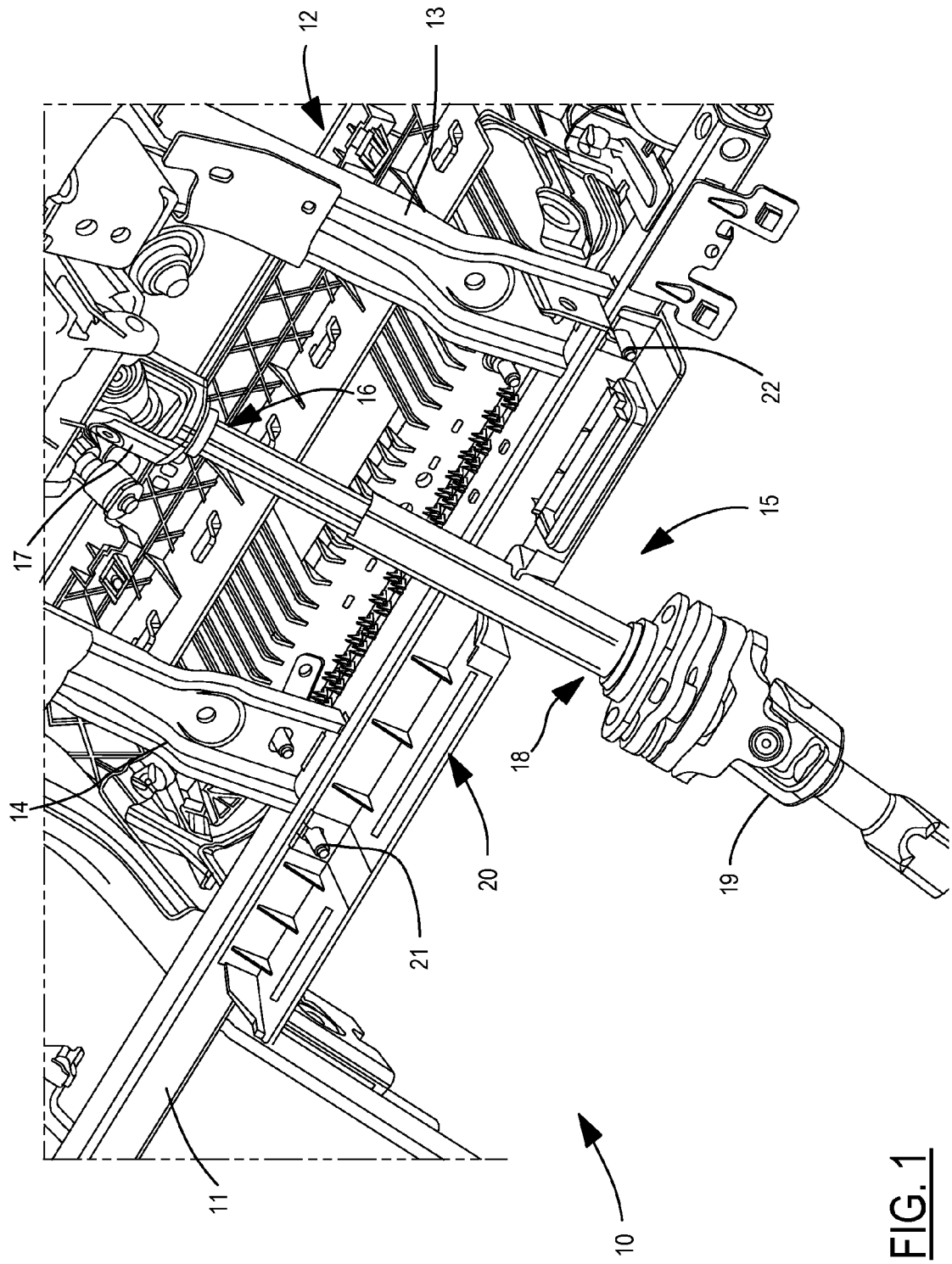
FIG. 1 is a perspective view of one embodiment of a modular instrument panel subassembly of the invention with a steering shaft assembly retained in a snap-in retainer slot.

Referring now to FIG. 1, an instrument panel subassembly 10 includes a cross car beam 11 which provides a main structural support for subassembly 10. An instrument panel substrate 12 is mounted to beam 11. Substrate 12 is typically an injection molded panel for supporting various accessories and components. A pair of brackets 13 and 14 attaches substrate 12 to cross car beam 11.

Subassembly 10 also includes a steering shaft assembly 15 having an upper end 16 with a swivel connection to the subassembly (e.g., to substrate 12 or some other intervening component mounted to substrate 12 such as a column carrier). As shown in the present embodiment, the swivel connection may include a universal joint 17 for coupling the shaft assembly to a steering wheel mechanism (not shown). Even if a universal joint is not used at the upper end of a shaft assembly, a swiveling connection/swiveling motion may still be present such as when the shaft assembly passes loosely through a collar or channel in the subassembly.

As used herein, a "steering shaft assembly" may or may not include a steering column surrounding the steering shaft. In any event, steering shaft assembly 15 has a lower end 18 for coupling to a steering gear assembly (not shown). Steering shaft assembly 15 may further include a universal joint and extension 19 which directly connects to the steering gear assembly.

FIG. 1 further shows a preferred embodiment of a closeout trim panel 20 which provides a toolless, non-disposable method for selectively retaining steering shaft assembly 15 to prevent unrestrained movement of steering column assembly 15 prior to final assembly into the vehicle. Closeout trim panel 20 is preferably comprised of an injection molded thermoplastic component which is adapted to attach directly to cross car beam 11 by mechanical fasteners 21 and 22 (e.g., nuts or screws).

As shown in FIG. 2, panel 20 comprises an elongated strip 25 having a forward plate 26, a center plate 27, and a rearward plate 28. Plates 26-28 are elongated and generally parallel with respect to the cross car beam. Plate 26 is in a car-forward direction with respect to the cross car beam, and plate 28 is in a car-rearward direction. An upstanding wall 29 extends from strip 25 between forward plate 26 and center plate 27. Wall 29 receives fasteners 21 and 22 to install it against a forward edge of the cross car beam. When installed, center plate 27 bears against a lower edge of the cross car beam. Forward plate 26 extends in the car-forward direction from the cross car beam in order to place a snap-in retainer slot 30 where it can temporarily retain the steering shaft assembly prior to final coupling to the steering gear assembly at a substantially fixed position which is spaced away from a final position of the steering shaft assembly when coupled to the steering gear assembly. Snap-in retainer 30 is formed in a raised pocket 31 having three walls and an open side 32. A receptacle is formed by an internal edge 33 defining an interior space which is accessible by passing the steering shaft assembly through a throat defined by pocket edges 34 and 35. The walls of pocket 31 are sufficiently flexible to allow the steering shaft to be pressed into the receptacle.

Forward plate 26 further includes a mounting aperture 40 configured to receive a light source, such as an LED module, for illuminating a foot well region in the vehicle located below the installed position of the instrument panel substrate. Mounting aperture 40 may include raised walls 41 for receiving and securing the lighting module. By integrating mounting aperture 40 into closeout panel 20, a separate bracket and other mounting hardware for the foot well light source are avoided.

FIG. 3 shows steering shaft assembly 15 received in snap-in retainer 30. The distance between the edges 34 and 35 is slightly less than the corresponding outer diameter of steering shaft assembly 15. Based on the properties of the thermoplastic material used to form closeout trim panel 20 and the thickness of the walls of pocket 31, a desired deflection force can be obtained so that shaft assembly 15 can easily be snapped into and out from retainer slot 30 as desired and so that shaft assembly 15 stays secured until manually removed during final installation to the vehicle.

FIG. 4 illustrates a lighting module 42 installed in mounting aperture 40 and connected to walls 41 so that a light output is directed to a foot well region located below trim panel 20. Lighting module 42 may be preferably mounted and electrically connected to the instrument panel subassembly by the subassembly supplier, but it could also be installed at the vehicle assembly plant if desired.

The closeout function of trim panel 20 is shown in FIG. 5 wherein the visible (i.e., Class A) sides of forward plate 26, center plate 27, and rearward plate 28 are shown. Closeout trim panel 20 has a desired finish (e.g., color and texture) on the visible side of the elongated strip 25. Strip 25 obscures different lines of sight from the passenger compartment to a rear side of the instrument panel substrate. In particular, center plate 27 obscures a line of sight to the cross car beam 11, forward plate 28 obscures lines of sight that would be present between cross car beam 11 and an upper portion 44 of the instrument panel substrate (e.g., a cover section of an airbag module), and rearward plate 26 obscures lines of sight that are forward of cross car beam 11.

Figure 6:
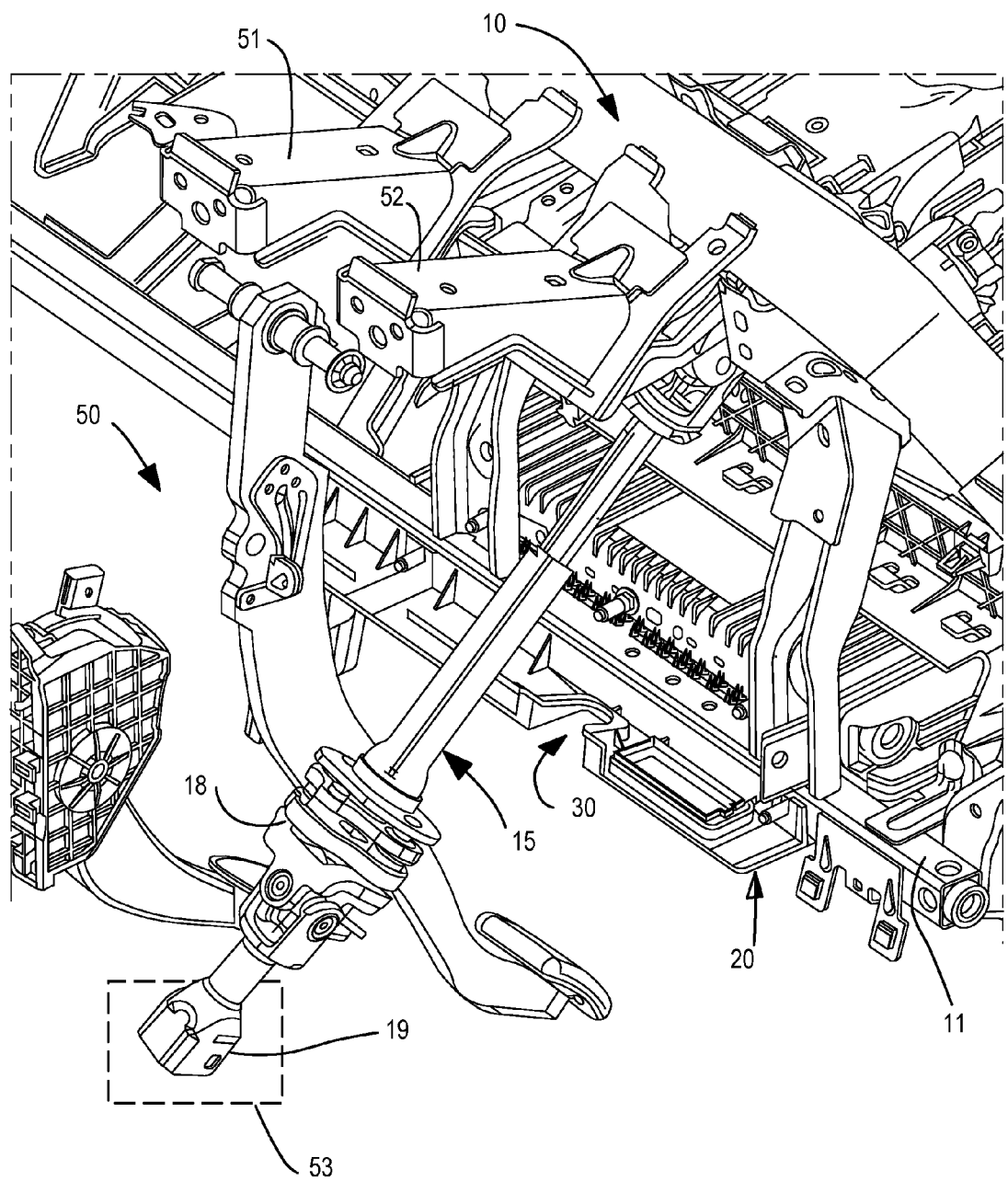
FIG. 6 is a perspective view of the instrument panel subassembly installed in a vehicle with the steering shaft assembly removed from the snap-in retainer for coupling to a steering gear assembly.

FIG. 6 shows instrument panel subassembly 10 after being installed in a vehicle 50 at a vehicle assembly plant. Cross car beam 11 is attached to a vehicle frame (and not shown). Addition mounting brackets such as brackets 51 and 52 further secure subassembly 10 to the frame. Once subassembly 10 is firmly mounted, steering shaft assembly 15 is removed from snap-in retainer slot 30 so that it's lower end 19 can be connected to the steering gear assembly 53. The process at the assembly plant requires no tools and avoids the need for removal of any ties, tape, or other material that would need to be disposed of.

What is claimed is:

1. An instrument panel subassembly, comprising:
   a cross beam providing a main structural support for the subassembly;
   an instrument panel substrate mounted to the cross beam;
   a steering shaft assembly having an upper end with a swivel connection to the substrate and having a lower end for coupling to a steering gear assembly; and
   a closeout trim panel comprising an elongated strip mounted to the cross beam and having a snap-in retainer slot positioned to temporarily retain the steering shaft assembly prior to final coupling to the steering gear assembly at a substantially fixed position which is spaced away from a final position of the steering shaft assembly when coupled to the steering gear assembly, wherein the retainer slot flexes to permit manual insertion and removal of the steering shaft assembly and wherein the steering shaft assembly is restrained from pivoting about the swivel connection when snapped into the retainer slot.

2. The subassembly of claim 1 wherein the strip is configured to obscure a line of sight to a rear side of the instrument panel substrate.

3. The subassembly of claim 1 wherein the strip includes a mounting aperture, and wherein the assembly further comprises a light source mounted in the mounting aperture for illuminating a foot well region below the instrument panel substrate.

4. A vehicle comprising:
   a cross beam;
   a beam-mounted instrument panel substrate;
   a steering shaft assembly with an upper swivel connection to the substrate and having a lower end coupled to a steering gear assembly; and
   a closeout trim panel comprising an elongated strip mounted to the cross beam and having a snap-in retainer slot positioned to releasably retain the steering shaft assembly at an offset shipping position preventing pivoting.

5. The vehicle of claim 4 wherein the offset position is spaced away from a final position of the steering shaft assembly when coupled to the steering gear assembly, and wherein the retainer slot flexes to permit manual insertion and removal of the steering shaft assembly.

6. The vehicle of claim 4 wherein the strip is configured to obscure a line of sight from a foot well of the vehicle to a rear side of the instrument panel substrate.

7. The vehicle of claim 4 wherein the strip includes a mounting aperture, and wherein the assembly further comprises a light source mounted in the mounting aperture for illuminating a foot well of the vehicle below the instrument panel substrate.

\* \* \* \* \*